United States Patent
Kogel et al.

(10) Patent No.: US 10,579,341 B2
(45) Date of Patent: Mar. 3, 2020

(54) GENERATION OF WORKLOAD MODELS FROM EXECUTION TRACES

(71) Applicant: Synopsys, Inc., Mountain View, CA (US)

(72) Inventors: Tim Kogel, Aachen (DE); Neeraj Goel, Noida (IN); Andreas Wieferink, Aachen (DE)

(73) Assignee: Synopsys, Inc., Mountain View, CA (US)

( * ) Notice: Subject to any disclaimer, the term of this patent is extended or adjusted under 35 U.S.C. 154(b) by 19 days.

(21) Appl. No.: 15/004,833

(22) Filed: Jan. 22, 2016

(65) Prior Publication Data
US 2016/0357516 A1 Dec. 8, 2016

(30) Foreign Application Priority Data

Jun. 8, 2015 (IN) .......................... 2856/CHE/2015
Jul. 30, 2015 (IN) .......................... 3910/CHE/2015

(51) Int. Cl.
| | |
|---|---|
| G06F 9/46 | (2006.01) |
| G06F 8/10 | (2018.01) |
| G06F 8/20 | (2018.01) |
| G06F 11/34 | (2006.01) |
| G06F 11/36 | (2006.01) |
| G06F 30/30 | (2020.01) |
| G06F 117/08 | (2020.01) |

(52) U.S. Cl.
CPC .................. G06F 8/10 (2013.01); G06F 8/20 (2013.01); G06F 8/24 (2013.01); G06F 11/3466 (2013.01); G06F 11/3612 (2013.01); *G06F 30/30* (2020.01); *G06F 2117/08* (2020.01); *G06F 2212/452* (2013.01)

(58) Field of Classification Search
CPC ................... G06F 8/10–54; G06F 11/30–3696
See application file for complete search history.

(56) References Cited

U.S. PATENT DOCUMENTS

| | | | | |
|---|---|---|---|---|
| 7,058,560 | B1 * | 6/2006 | Arakawa | G06F 11/3452 702/182 |
| 8,010,337 | B2 * | 8/2011 | Narayanan | G06F 11/3419 703/22 |
| 8,180,604 | B2 * | 5/2012 | Wood | G06F 9/5077 703/2 |
| 8,464,103 | B2 * | 6/2013 | Adler | G06F 11/3636 714/45 |
| 8,560,618 | B2 * | 10/2013 | Pacheco-Sanchez | G06F 11/3447 705/7.29 |
| 9,164,785 | B2 * | 10/2015 | Kraft | G06F 9/45533 |
| 2008/0319730 | A1 * | 12/2008 | Clark | G06F 17/5022 703/19 |

(Continued)

*Primary Examiner* — Wissam Rashid
(74) *Attorney, Agent, or Firm* — Fenwick & West LLP

(57) ABSTRACT

Methods and computer readable media for software modeling. The method comprises accessing one or more software execution traces describing execution times of tasks within software executed on a target platform. The method also comprises generating a workload model of the software based on the one or more software execution traces of the software executed on the target platform. The workload model describes tasks of the software and workloads on the target platform associated with the tasks of the software.

22 Claims, 12 Drawing Sheets

(56) References Cited

U.S. PATENT DOCUMENTS

| | | | |
|---|---|---|---|
| 2010/0083248 A1* | 4/2010 | Wood | G06F 9/5077 718/1 |
| 2012/0102365 A1* | 4/2012 | Adler | G06F 11/3676 714/45 |
| 2012/0109936 A1* | 5/2012 | Zhang | G06F 17/30312 707/713 |
| 2012/0239376 A1* | 9/2012 | Kraft | G06F 9/45533 703/22 |
| 2013/0007259 A1* | 1/2013 | Pacheco-Sanchez | G06F 11/3447 709/224 |
| 2015/0033239 A1 | 1/2015 | Heilper et al. | |
| 2017/0286146 A1* | 10/2017 | Voigt | G06F 9/50 |

* cited by examiner

| Task (func) | Iterations | Start delay | Wait delay | Processing cycles |
|---|---|---|---|---|
| main | 1 | 0 | 0 | 0 |
| A | 0 | 0 | 0 | 15,000 |
| B | 0 | 0 | 0 | 15,000 |
| C | 0 | 0 | 0 | 15,000 |

310

| Task (func) | Destination | Rate |
|---|---|---|
| main | A | 2 |
| A | B | 1 |
| B | C | 1/2 |

320

| Task (ctxt) | Iterations | Start delay | Wait delay | Processing cycles |
|---|---|---|---|---|
| A | 2 | 0 us | 40 us | 15,000 |
| B | 3 | 10 us | 17.5 us | 10,000 |
| C | 1 | 15 us | 0 us | 15,000 |

420

GENERATION OF WORKLOAD MODELS FROM EXECUTION TRACES

CROSS REFERENCE TO RELATED APPLICATIONS

This application claims priority from Indian Patent Application No. 2856/CHE/2015, filed on Jun. 8, 2015, and also claims priority from Indian Patent Application No. 3910/CHE/2015, filed on Jul. 30, 2015, the contents of which are both incorporated by reference in their entirety.

BACKGROUND

Discovering system performance problems late in the hardware development hardware can be catastrophic to project schedules and product competitiveness. Thus, accurate performance analysis must be completed earlier in the design cycle before the hardware specifications are finalized. In order to test performance of hardware, such as a system on chip (SoC), software is typically executed on a prototype model of the hardware. However, difficulties arise when the software has not yet been developed for the hardware being tested. The problem can be solved by creating workload models of the software.

Creation of these workload models often requires very good understanding of the target software application, as well as the target platform. In many cases, either or both of them may not be available due to several reasons, like legacy software code, complex software applications, and complex hardware platform.

SUMMARY

Embodiments of the present disclosure relate to methods, systems, and non-transitory computer readable mediums for generating a workload model from software execution traces. The workload model can be used in place of software to analyze the performance of a target platform, thereby allowing a hardware design to be tested when the software is not yet available.

In one embodiment, a method for software modeling is disclosed. The method comprises accessing one or more software execution traces describing execution times of software tasks for software executed on a target platform. The method also comprises generating a workload model of the software based on the one or more software execution traces of the software executed on the target platform. The workload model describes tasks of the software and workloads on the target platform associated with the tasks of the software.

In one embodiment, the workload model of the software is a task graph having task nodes. Each task node represents a respective task of the software and includes one or more respective workload parameters describing a workload associated with the task. In some embodiments, the nodes can be connected by edges that represent dependencies between the tasks.

BRIEF DESCRIPTION OF THE FIGURES

The teachings of the embodiments herein can be readily understood by considering the following detailed description in conjunction with the accompanying drawings.

DETAILED DESCRIPTION OF THE EMBODIMENTS

Reference will now be made in detail to several embodiments of the present disclosure, examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

Figure 1:
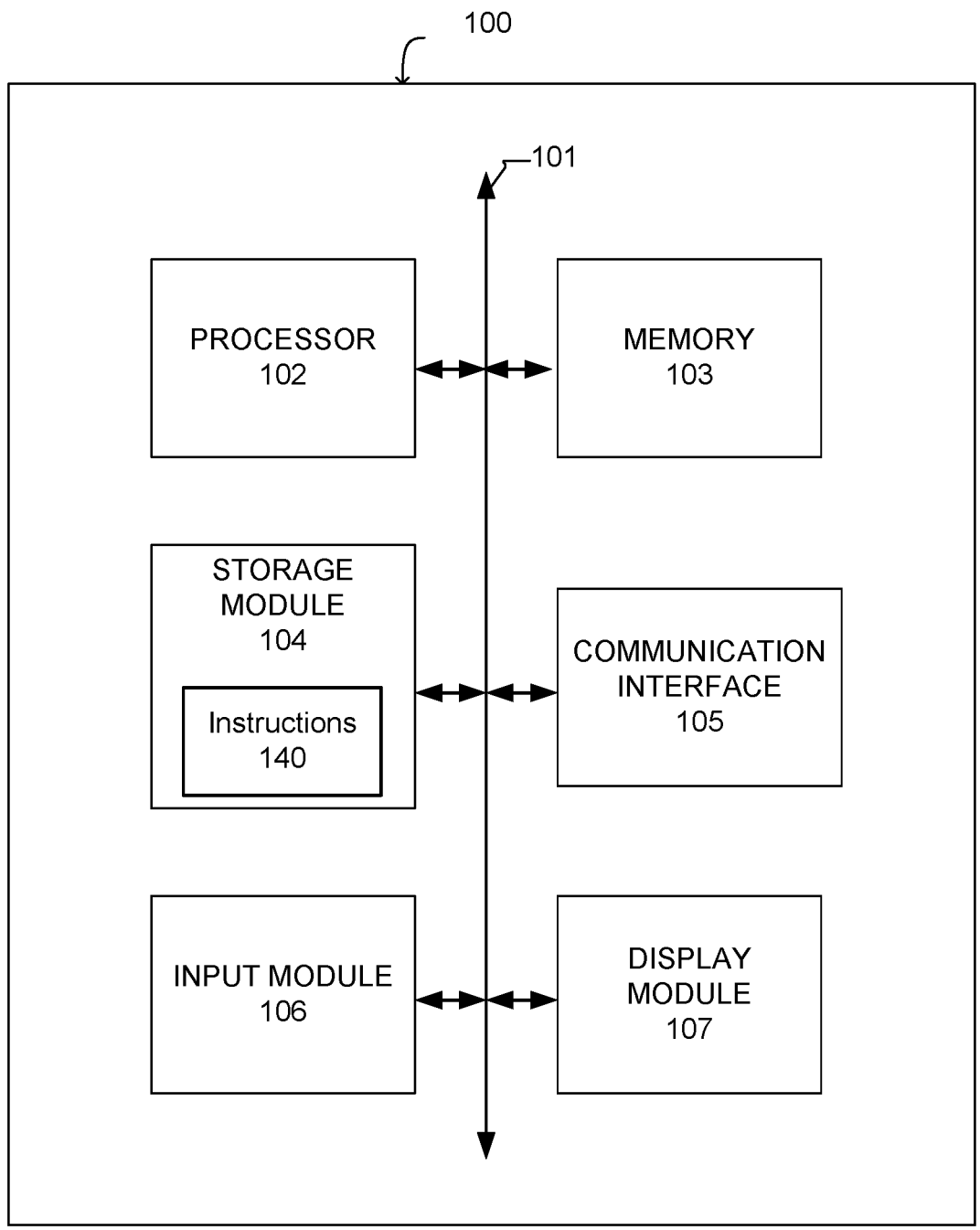
FIG. 1 illustrates the hardware architecture of a computing system, according to one embodiment.

FIG. 1 illustrates the hardware architecture of a computing system, according to one embodiment. In one embodiment, the computing system 100 is a computer including components such as a processor 102, a memory 103, a storage module 104, an input module (e.g., keyboard, mouse, and the like) 106, a display module 107 and a communication interface 105, exchanging data and control signals with one another through a bus 101. The storage module 104 is implemented as one or more non-transitory computer readable storage media (e.g., hard disk drive), and stores software instructions 140 that are executed by the processor 102 in conjunction with the memory 103 to implement the operations described herein. Operating system software and other application software may also be stored in the storage module 104 to run on the processor 102.

In one embodiment, a method for automatic generation of workload models from the execution trace of software is disclosed. A workload model is an abstract representation of real software, which is used for early architecture analysis. The workload model can describe tasks of the software and workloads on the target platform associated with the tasks of the software.

The execution of software on a target platform (e.g. model, prototype, final platform) generates execution traces (e.g. function trace, process trace, number of loads and stores, etc). A workload model is generated automatically by aggregating the execution trace into a task graph. In one embodiment, a task graph represents the software. The task graph includes nodes that denote computational tasks. The task graph may also include edges connecting the nodes represent dependency relationships between tasks of different nodes.

The generation of the task graph can include the following steps. The tasks and dependencies between the tasks are detected to create the structure of the task graph. Each task is characterized with the respective statistical distribution of processing cycles, and the number of loads/stores for each function/process. The accuracy of the generated traffic is further increased by taking (1) the number of cache hits/misses, and (2) the memory region and region type information into account. The accuracy of the execution time and processing cycles is further enhanced by using characterized cycle-per-instruction information for each processor instruction of a task.

Figure 2:
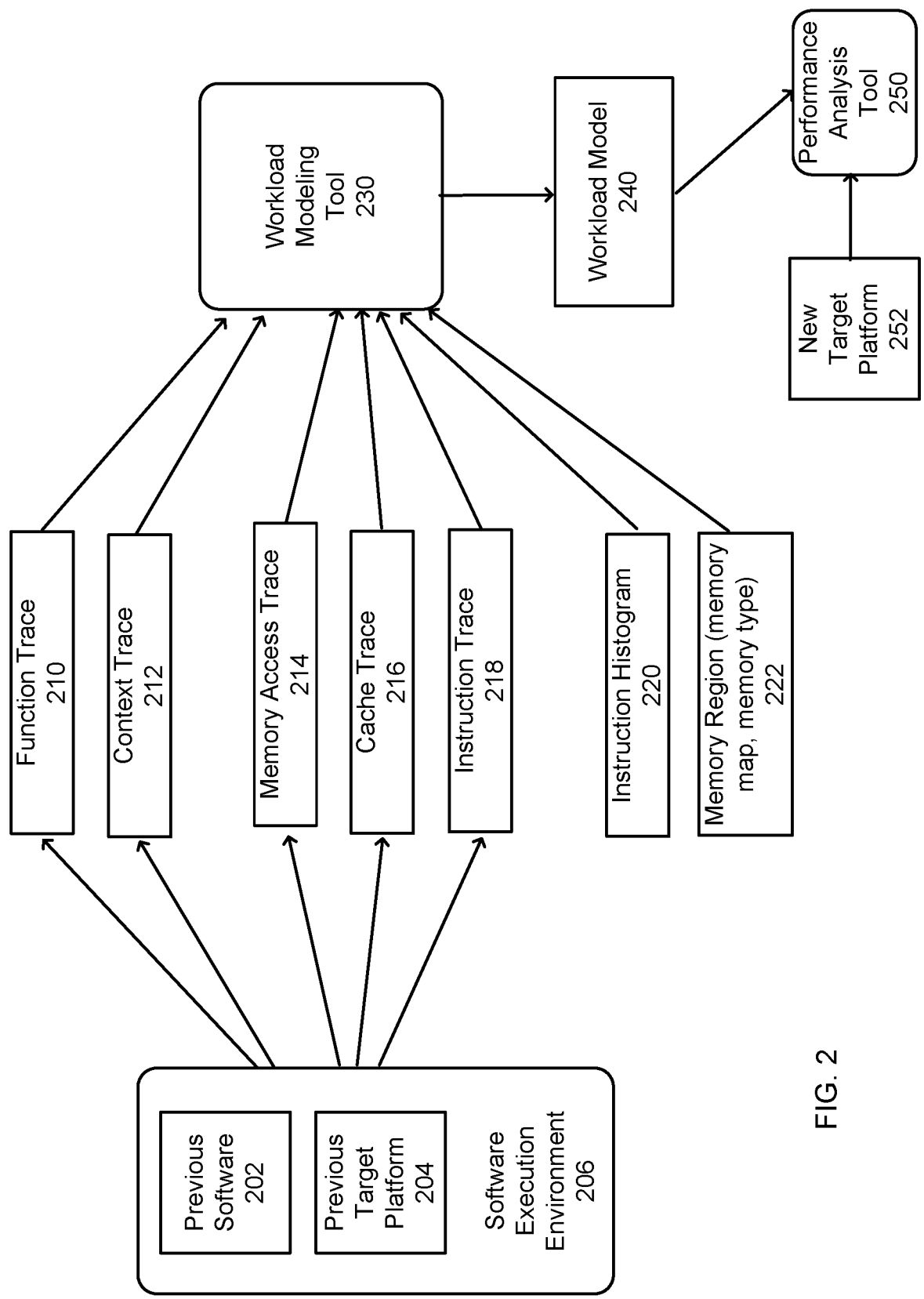
FIG. 2 is a diagram illustrating a system for generation and use of a workload model, according to an embodiment.

FIG. 2 is a diagram illustrating a system for generation and use of a workload model, according to an embodiment. The system allows the performance of a new target platform design to be estimated before a new version of software has been developed for the new target platform 252. In one embodiment, a target platform represents a system on chip (SoC) that includes hardware components such as processor cores, memory, a memory interconnect, etc. The target platform is typically a model of the SoC hardware (e.g. a SystemC model). Together a target platform and the software executed on the target platform form a target system.

Initially a previous version of the software 202 ("previous software") and a previous version of the target platform 204 ("previous target platform") are provided. The previous software can include an operating system (OS) and several software applications that run on the OS. The previous software 202 is written for and is compatible with the previous target platform 204. The previous software 202 is executed on the previous target platform 204 in a software execution environment 206. In one embodiment, the previous target platform 204 is a SystemC model of older SoC hardware and the software execution environment 206 is a SystemC simulator that simulates the previous software 202 running on the SystemC model. In other embodiments the previous target platform 204 can be actual physical hardware representing an older SoC design.

The execution of previous software 202 on the previous target platform 204 generates one or more software execution traces describing execution of the software 202 on the previous target platform 204 over time. The software execution traces can generally describe behaviors observed during software execution, such as interactions between the previous software 202 and the previous target platform 204 and actions performed by the previous target platform 204 while the previous software 202 is being executed. The traces can include a function trace 210, a context trace 212, a memory access trace 214, a cache trace 216 and an instruction trace 218, among others. The traces are illustrated as being distinct entities, but in one embodiment the traces may all be part of the same trace file or stored into a common database.

The function trace 210 and/or the context trace 212 are the primary trace inputs to the workload modeling tool 230. Function traces 210 and context traces 212 describe specific tasks within software executed on the previous target platform 204, as well as execution times of the tasks. A task may refer to either a software function or a software context, as will be described herein. A workload modeling tool 230 accesses either the function trace 210 or the context trace 212 and generates a workload model of the software from the function trace 210 or context trace 212. Whether the function trace 210 or context trace 212 is used depends on the desired level of granularity for the workload model 240.

A context trace 212 describes the execution timing of different software contexts over time. A software context can be a software process representing an instance of an executed computer program. For example, there can be one software context for a web browser process, a second software context for a word processor process, and another software context for an anti-virus program process. Each software context has a different ID and includes multiple software functions.

A function trace 210 describes the execution timing of different software functions over time and dependency relationships between the functions. For example a web browser process may have various software functions, like finding the domain name, retrieving the page from internet, displaying the page on screen. Each of these functions can also call another set of functions. A software function is implemented through the execution of multiple processor instructions on a target platform.

Thus, a software context can be implemented with multiple software functions, and a software function can be implemented with multiple processor instructions. As previously explained, a task may refer to either a software function or a software context.

The workload modeling tool 230 also accesses other secondary inputs that are used to increase the accuracy of the workload model 240. These secondary inputs include the memory access trace 214, the cache trace 216, the instruction trace 218, the instruction histogram 220, and the memory region information 222. The details of the primary and secondary inputs and their uses will be explained by reference to other figures. Other inputs that may be utilized by the workload modeling tool 230 include inputs describing static characteristics of a processor of the previous target platform 204, such as size of cache, line buffer, store buffer, pre-fetch buffer information, width of the bus ports, bus protocol, etc.

The resulting workload model 240 is an abstract representation of real software (e.g., OS and its applications), and can be used for early architecture analysis. The workload model 240 describes tasks (e.g., software contexts or software functions) of the software and workloads on the target platform that are caused by the tasks of the software. More specifically, the workload model describes tasks of the software and the computation load and communication load on the target platform triggered by the tasks of the software. The computation load is caused by the occupation of computational resources of the target platform. The communication load is caused by the occupation of communication resources and memory subsystem resources of the target platform. Each task is characterized with the respective statistical distribution of processing cycles, and the number of loads/stores for each function/process context, along with other workload parameters.

In one embodiment the workload model 240 may take the form of a task graph. The task graph includes nodes representing software tasks within the software. Each node includes workload parameters describing a workload on the target platform hardware caused by the software task. The specific form of the task graph and its contents differ depending on whether the function trace 210 or context trace 212 is used to generate the workload model 240.

Figure 2B:
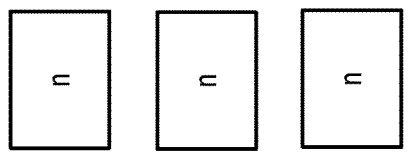
FIG. 2B is a task graph generated from a context trace, according to an embodiment.
Figure 2A:
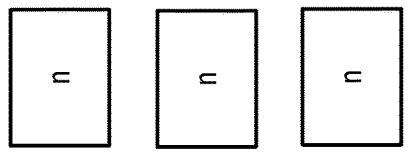
FIG. 2A is a task graph generated from a function trace, according to an embodiment.
Figure 2A:
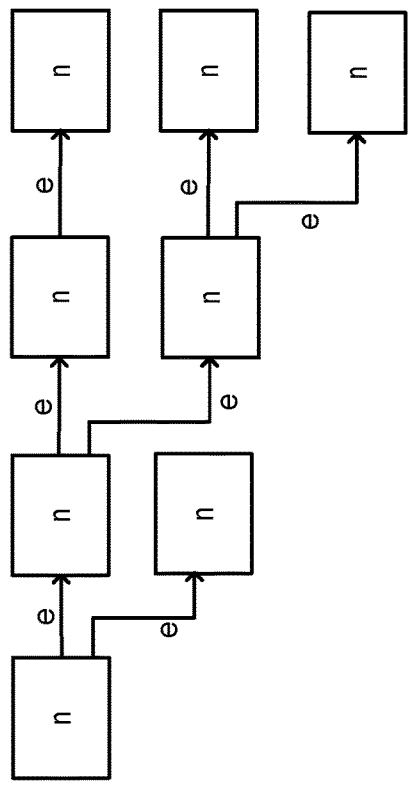

Referring to FIG. 2A, illustrated is a task graph generated from a function trace 210, according to an embodiment. The task graph includes several nodes n. Each node usually represents a different software function. Each function from the input function trace 210 will form a task for a node of the task graph. The task graph also includes directed edges e that connect an originating node to a destination node. The edges represent execution dependencies between the nodes, such as calls from one function and another. For example, if in a host application a function calls ten different functions, the task graph would include ten edges connecting the callee functions to all ten called functions. Each edge may include rate information describing an average rate at which the function of an originating node calls the function of a destination node.

Referring to FIG. 2B, illustrated is a task graph generated from a context trace 212, according to an embodiment. The task graph includes several nodes n. Each node represents a different software context. Unlike FIG. 2A, the task graph generated from a context trace 212 is an edgeless graph and does not include directed edges connecting the nodes n. However, in some embodiments where dependencies exist between contexts, those dependencies can be detected and used to add edges to the task graph.

Context trace analysis may be suitable where a large number of applications are running on OS, and each application can be mapped to different task. All the tasks are typically independent of each other. On the other hand, function trace analysis is more suitable for complete application analysis where more detail is needed.

Figure 2C:
FIG. 2C is a node from the task graph of either FIG. 2A or FIG. 2B, according to an embodiment.

Referring to FIG. 2C, illustrated is a node from the task graph of either FIG. 2A or FIG. 2B, according to an embodiment. Each node can include a task name 292 and workload parameters 294 describing a workload, such as computation load and communication load, on the target platform hardware triggered by the task and observed during execution of the previous software 202 on the previous target platform 204. The workload parameters can be generated by, for each task, aggregating statistical information from the traces across all invocations of the task. Examples of workload parameters 294 include:

Iterations: For context traces, this indicates a number of times a context is invoked during the context trace Start delay: For context traces, this indicates the delay between the beginning of a trace and when a first instance of a context is invoked.

Wait delay: For context traces, this indicates the average delay between when an invocation of a context ends and when a subsequent invocation of that context begins Processing cycles: For context traces, cycles are the average number of clock cycles for which the context was active and running. For function traces, it is average number of clock cycles executed by the corresponding target function in reference traces.

Fetchratio: Indicates the ratio of instructions fetched in one processing cycle. Assuming each cycle would fetch one instruction, the fetch ratio can be set to 1. As another example: 32 bit instructions fetched with a 64 bit bus can result in a default ratio of 0.5.

Loadratio: Indicates the ratio of instructions that require loading data from memory. It can be estimated as number of read accesses/number of processingcycles.

Storeratio: Indicates the ratio of instructions that require storing data to memory. It can be estimated as number of write accesses/number of processingcycles.

In one embodiment, the task graph can be internally stored in one or more data structures. One or more tables may store a list of tasks representing nodes of the task graph, and for each task, one or more workload parameters (e.g. start delay, wait delay, etc) dedicated to that task. An additional connection table may store information describing connections between tasks if they exist, which corresponds to the edges of the task graph.

Referring back to FIG. 2, in some embodiments, the workload modeling tool 230 may be logically divided into a frontend and a backend (not shown). The frontend receives software execution traces and other inputs from different sources and normalizes the information into respective comma separated value (CSV) files. The backend then receives the normalized CSV files and uses the normalized CSV files to generate the workload model 240.

The resulting workload model 240 can be stored in a memory and subsequently provided to a performance analysis tool 250. The performance analysis tool 250 uses the workload model 240 in conjunction with a model (e.g. SystemC model) of a new version of the target platform 252 to analyze performance of the new target platform design or to simulate the new version of the target platform 252. The performance analysis tool 250 can then generate a displayable software analysis (e.g. visualizations of expected performance) that is displayed to a designer. Ideally, the extracted workload parameters in the workload model 240 depend only on the previous software 202 and its stimuli, but do not depend on the specifics of the previous target platform 204 used to generate the software execution traces. In this manner, the resulting workload model 240 can easily be mapped to different and newer target platform models.

Function Trace

Figures 3A, 3B:
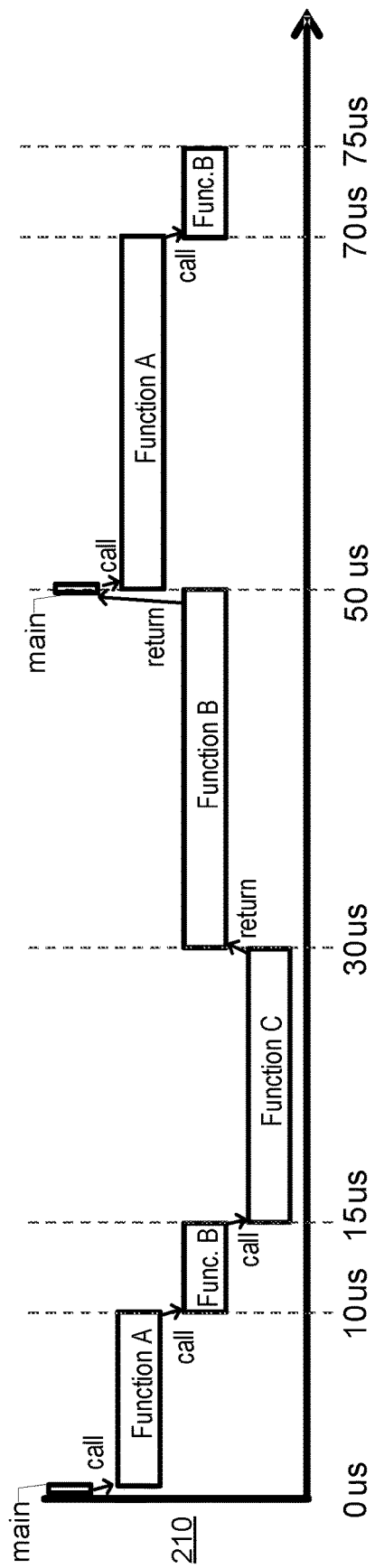
FIG. 3A illustrates a function trace, according to an embodiment.
FIG. 3B illustrates a table representation of a workload model generated from the function trace of FIG. 3A, according to an embodiment.

Generating a workload model from a function trace is now explained by reference to FIGS. 3A-3C. FIG. 3A illustrates a function trace 210, according to an embodiment. A function trace 210 describes the execution timing of different software functions over time and dependencies between the functions. In one embodiment, the function trace 210 contains the following information: name of an event (e.g. function calls or returns), start time of the event, and name of the function executed after the event.

For example, as illustrated in FIG. 3A, the function trace 210 describes the execution of software functions main, A, B and C. At 0 μs, the function trace 210 includes a function call event to function A. The event indicates that function "main" has called function "A". At 10 μs, the function trace 210 includes a function call event to function B. At 15 μs, the function trace 210 includes a function call event to function C. At 30 μs, the function trace 210 includes a function return event to function B. At 50 μs, the function trace 210 includes a function return event directly back to function main, and then another call event to function A. At 70 μs the function trace 210 includes a function call event to function B.

FIG. 3B illustrates a table representation of a workload model generated from the function trace 210 of FIG. 3A, according to an embodiment. To generate the tables, the workload model generator 230 extracts a list of functions from the function trace 210. The workload model generator 230 also aggregates the data across different invocations of the functions into a concise set of workload information. Specifically, the workload model generator 230 determines a respective statistical distribution of processing cycles for each task, such as the average number of processing cycles that a function is executed for when a function is called. A table 310 is then populated with this information.

For example, for table 310, the first column includes a list of software tasks in the form of software functions. The list includes functions main, A, B and C. The last column lists the average processing cycles that each function is executed for. In this example, for simplicity it is assumed that a processing cycle of the underlying target platform is equal to 1 ns of time. Function A executes for an average of 15,000 processing cycles (e.g., 10 µs+20 µs, divided by 2) each time it is called. Function B also executes for an average of 15,000 processing cycles each time it is called (e.g. 5 µs+20 µs+5 µs, divided by 2). Note that in this embodiment the execution of function B between 10 µs to 15 µs and between 30 µs and 50 µs is considered to be a single invocation of function B since it is being returned data from function C. The three middle columns are not relevant in this case and are therefore shaded with diagonal shading.

The workload model generator tool 230 further detects dependencies between the functions of the function trace 210, such as which functions call other functions. The average rate at which the functions call other functions is then calculated. This information is used to populate a connection table 320 representing edges of a task graph.

For example, the first column of the connection table 320 includes a list of functions that call other functions. The second column of the connection table 320 includes the functions called by the functions in the first column. The third column indicates an average rate at which an instance of a function calls another function. For example, the main function calls the A function two times each time it is invoked. The A function calls the B function one time each time it is invoked. The B function calls the C function half the time when it is invoked.

Figure 3C:
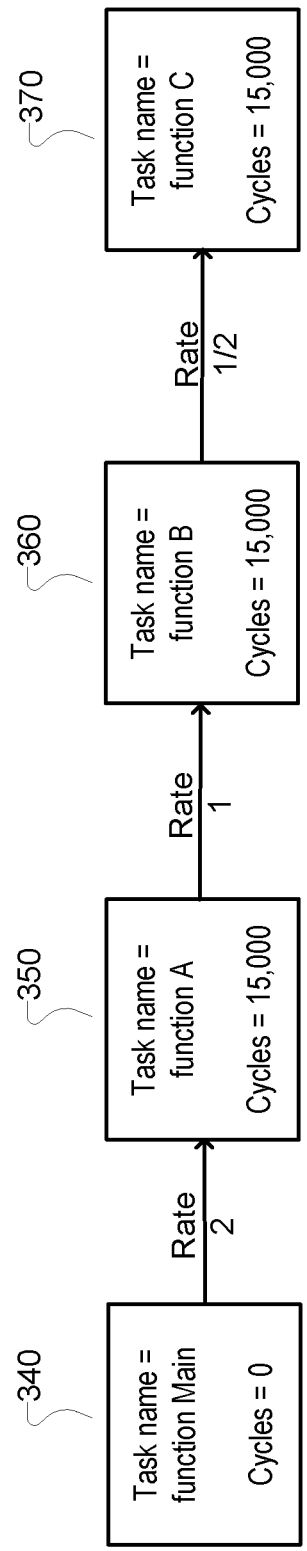
FIG. 3C illustrates a task graph representation of a workload model corresponding to the workload tables of FIG. 3B, according to an embodiment.

FIG. 3C illustrates a task graph representation of a workload model corresponding to the workload tables of FIG. 3B, according to an embodiment. The task graph include several nodes 340, 350, 360 and 370. Each node includes the name of a respective task. Each node also includes the processing cycles parameter corresponding to the processing cycles in table 310. Edges connect the nodes and include the rate at which a function of an originating node calls a function of a destination node. The edges correspond to the information in table 320. The graph of FIG. 3C may also be referred to as a callgraph.

Context Trace

Figures 4A, 4B:
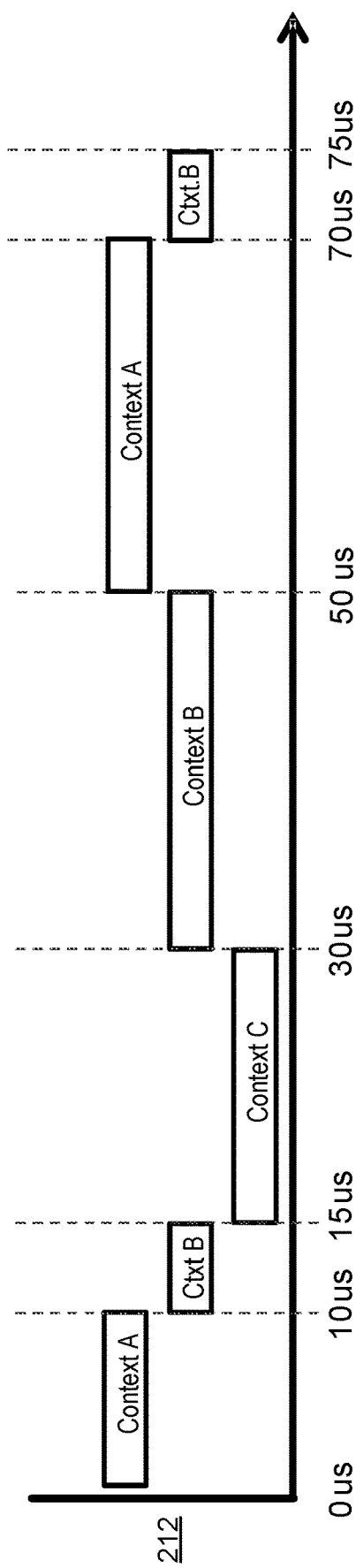
FIG. 4A illustrates a context trace, according to an embodiment.
FIG. 4B illustrates a table representation of a workload model generated from the context trace FIG. 4A, according to an embodiment.

Generating a workload model from a context trace is now explained by reference to FIGS. 4A-4C. FIG. 4A illustrates a context trace 212, according to an embodiment. A context trace 212 describes the execution timing of different software contexts over time. In one embodiment, the context trace 212 can contain the following information for different contexts: name of context, start time of the context, and duration of the context.

For example, as illustrated in FIG. 4A, the context trace 212 describes the execution of software contexts A, B and C. At 0 µs, context A starts. At 10 µs, context A ends and context B starts. At 15 µs, context B ends and context C starts. At 30 µs, context C ends and context B starts. At 50 µs, context B ends and context A starts. At 70 µs, context B starts.

Note that the timescales are the same in the function trace 210 of FIG. 3A and the function trace of FIG. 4A. However, in practice, FIGS. 3A and 4A would have different timescales since the function trace can represent the functions of a single context. For example, the function trace could go from 0 µs to 7.5 µs, and the context trace could go from 0 to 750 µs.

FIG. 4B illustrates a table representation of a workload model generated from the context trace 212 of FIG. 4A, according to an embodiment. To generate the tables, the workload model generator tool 230 extracts a list of contexts from the context trace 210. The contexts are listed in the first column of the table 420. The workload model generator tool 230 also aggregates the data across different invocations of a context into a concise set of workload information that results in different workload parameters.

The workload model generator 230 determines a number times each context is invoked in the context trace 212. The number of times each context is invoked is listed in the second column of the table 420 under the iterations heading.

The workload model generator 230 calculates a start delay for each context. The start delay is computed from the time between the start of a context trace and when the first invocation of a context occurs. The start delay is stored in the third column of the table 420.

The workload model generator 230 measures the delay between when each invocation of a context ends and when the next invocation of that context starts. The delays are averaged to generate a wait delay, which indicates the average delay between when an invocation of a context ends and when a subsequent invocation of that context begins. The wait delay is stored in the fourth column of table 420.

The workload model generator 230 also determines a respective statistical distribution of processing cycles for each task, such by averaging, across context invocations, the number of processing cycles that a context is executed for when invoked. The average processing cycles is stored in the $5^{th}$ column of table 420.

For example, context A repeats 2 times. The delay to the start of the first invocation of context A is zero seconds. The average wait delay between invocations of context A is 40 µs. When context A is invoked it executes for an average of 15,000 cycles. Context B repeats 3 times. The delay to the start of the first invocation of context B is 10 µs. The average wait delay bet Ten invocations of context B is 17.5 µs (15 µs+20 µs, divided by 2). When context B is invoked it executes for an average of 10,000 cycles.

Figure 4C:
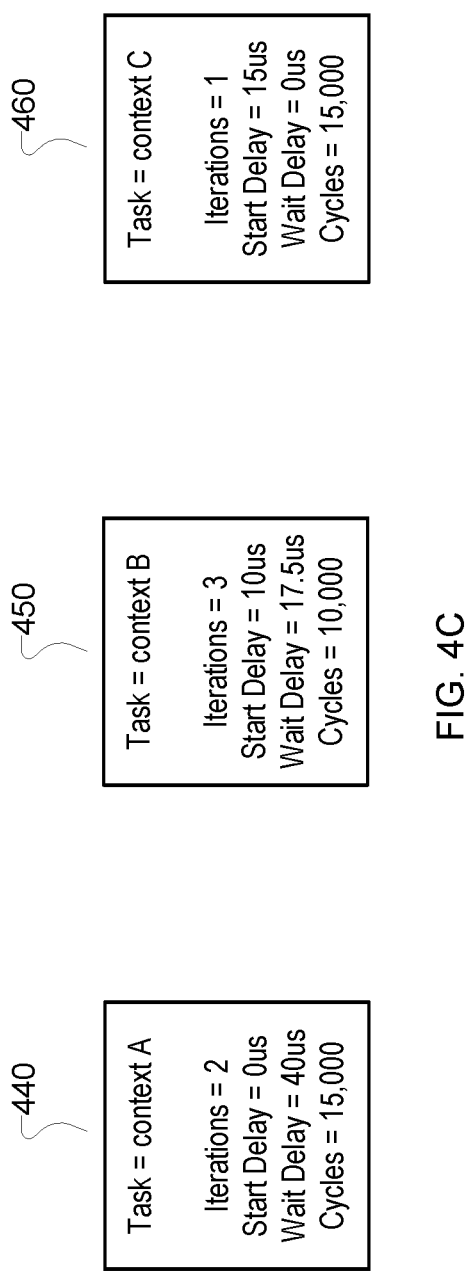
FIG. 4C illustrates a task graph representation of a workload model corresponding to the tables of FIG. 4B, according to an embodiment.

FIG. 4C illustrates a task graph representation of a workload model corresponding to the tables of FIG. 4B, according to an embodiment. The task graph includes several nodes 440, 450 and 460. Each node includes the name of a respective task. Each node also includes the workload parameters for the iterations, start delay, wait delay, and processing cycles corresponding to the information from table 420. The task graph generated from a context trace is an edgeless graph and does not include edges connecting the nodes.

Memory Access Trace and Cache Access Trace

One of the inputs that can be used to improve the detail of the workload model is a memory access trace 214. The memory access trace 214 describes memory accesses over time that occur during execution of software on the target platform. In one embodiment, the memory access trace 214 includes the following information: time intervals, number of memory loads and stores (i.e., reads and writes) during each interval, name of memory block region for which memory accesses are made during each interval, function name and context name. For example, the memory access trace 214 may indicate that during a time interval of 0 µs to 1 µs, function A makes 10 memory loads from and 20 memory stores to a memory block region named Hardware.MemA. The memory access trace 214 may also indicate that during a time interval of 1 µs to 2 µs, function B makes 20 memory loads from and 5 memory stores to a memory block region named Hardware.MemB.

The memory access information in the memory access trace 214 can be aggregated together for each task across different invocations of the task into individual workload parameters. For a given task, the number of memory loads that occur when the task is active is counted. The number of memory loads is then divided by a total number of processing cycles during which the task is active. The result is a memory load ratio parameter. Similarly, for a given task, the number of memory stores that occur when the task is active is counted. The number of memory stores is then divided by a total number of processing cycles during which the task is active. The result is a memory store ratio parameter.

Figure 5:
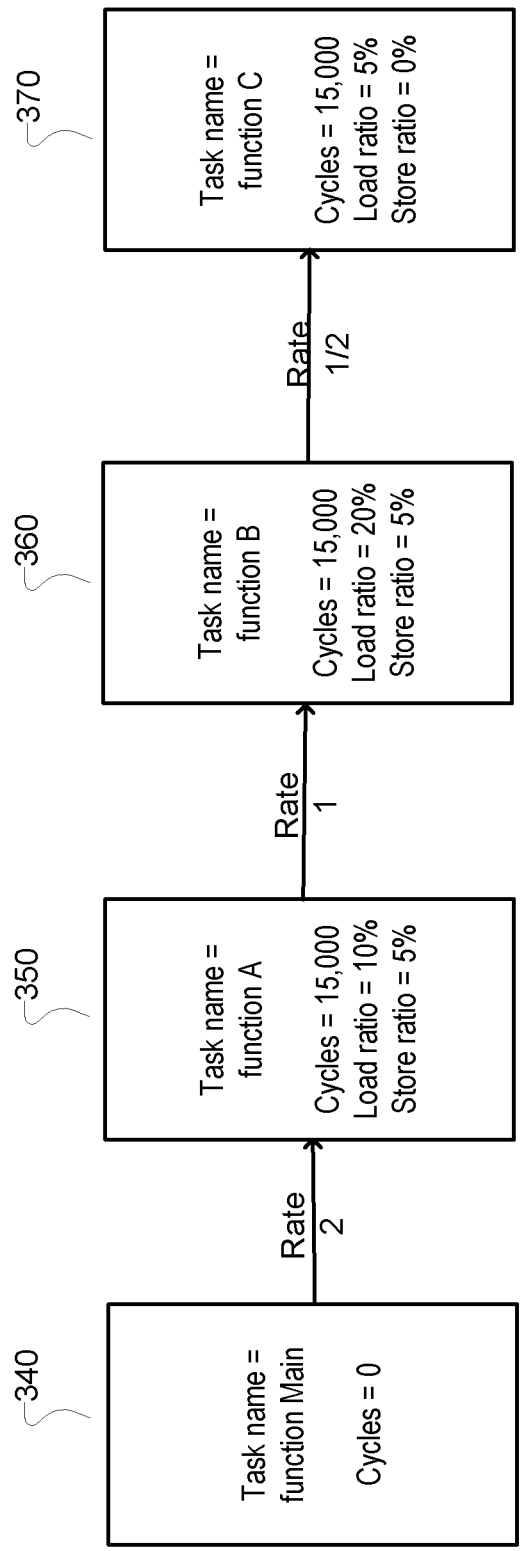
FIG. 5 illustrates a task graph from FIG. 3C that includes additional workload parameters for memory accesses.

FIG. 5 illustrates a task graph from FIG. 3C that includes additional workload parameters for memory accesses. For example, for node 350 that represents function A, the load ratio is 10% and the store ratio is 5%. For node 360 that represents function B, the load ratio is 20% and the store ratio is 5%. For node 370 that represents function C, the load ratio is 5% and the store ratio is 0%.

The load/store/fetch ratios are used to generate real memory traffic when used by the performance analysis tool 250. The memory block name with the help of memory region information 222 determines to which address range the memory access is made, as will be explained below. The ratios indicate the frequency of the accesses to the memory addresses.

Another input that can be used to improve accuracy of the workload model is a cache access trace 216. The cache access trace 216 describes accesses to a cache of the target platform over time while the software is being executed. In one embodiment, the cache access trace 216 includes the following information: read cache hits, read cache misses, write cache hits, and write cache misses, instruction cache hits and instruction cache misses.

The previously described number of memory loads and memory reads are assumed by default to be memory accesses requiring access to external memory if there is no processor cache. In practice most target platform processors will have a cache to prevent memory accesses from requiring external bus access. To predict the number of memory accesses actually going to an external bus, cache hit/miss ratios can be computed and used to refine the parameters for load and store ratios. If the memory to which access is made is assumed to be cacheable, then only accesses which miss the cache will access the memory via the external bus. Therefore, to enhance the accuracy of the memory traffic, a cache access trace 216 is used. The cache usually has a huge impact on generated memory traffic. When no cache access trace 216 is used for a target platform that does contain caches, overall hit/miss ratios would need to be guessed and would likely not be accurate.

For a given task, a read cache miss ratio is computed from (cache) read hits and (cache) read misses. A cache write miss ratio is computed from (cache) write hits and (cache) write misses. An instruction cache miss ratio is calculated from instruction hits and instruction misses.

The workload parameters related to memory access can then be modified in accordance with the cache miss ratios. Specifically, the load ratio is multiplied by the read cache miss ratio, the store ratio is multiplied by the write cache miss ratio, and the instruction ratio is multiplied by the instruction cache miss ratio.

Figure 6:
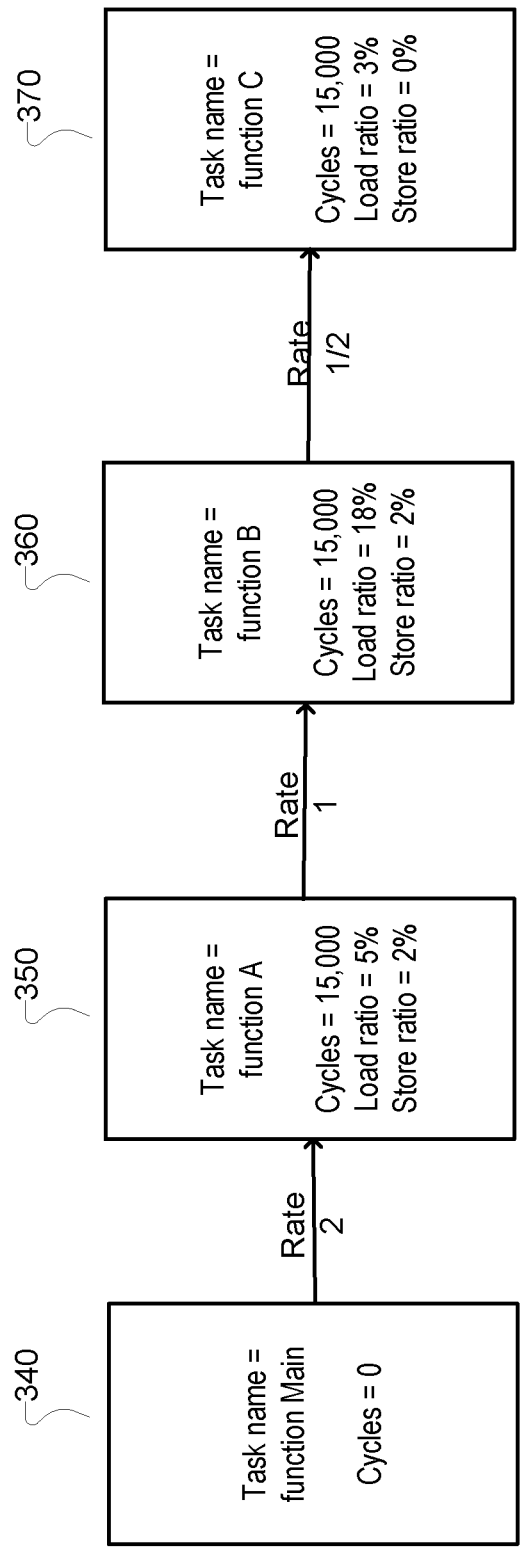
FIG. 6 illustrates a task graph from FIG. 5 that includes workload parameters adjusted for cache misses.

Referring to FIG. 6, illustrated is a task graph from FIG. 5 that includes workload parameters adjusted for cache misses. The load ratios and store ratios are now lower relative to FIG. 5 because they have been adjusted to account for cache misses. For example, the load ratio for node 350 can be computed as the original load ratio of 10% times a write cache miss ratio of 50%, which results in an adjusted load ratio of 5%. Alternatively, the cache miss ratios can be populated as separate workload parameters within each node. The write cache miss ratio of 50% is just an example, and can be much lower in many situations, thereby causing a significant reduction in the adjusted load ratio.

The cache miss ratios rates may vary depending the specific software application being executed and the cache size (this is just an example for platform dependency) of the previous target platform 204. In one embodiment, in which the new target platform 252 contains stochastic cache models, the miss ratios measured per task and memory could be split into two factors: one task independent factor to be annotated to the target platform's cache models, and a task dependent factor to be annotated to the individual tasks of workload model 240. The task independent factor is constant and could for example always be 1.0, or it could be the average of all measured miss ratios of a cache instance. At simulation runtime, this cache model annotated factor is multiplied by the respective task annotated factor to result in the original miss rate.

Another input that can be used to improve accuracy of the workload model is the memory region information 222. The memory region information 222 can include two types of information: memory map information and memory type information.

The memory map information includes a mapping between names of memory block regions and address regions for the memory block regions. For example, the memory map information may indicate that memory block Hardware.MemA starts at base address 0x8000000 and has a memory size of 0x400000. And that memory block Hardware.MemB starts at base address 0xF000000 and has a memory size of 0x200000. In one embodiment, the address region information may include processor port specific address ranges via which memory block regions may be accessed.

The memory map information is used in conjunction with the memory access trace 214 to add additional parameters to the workload model 240. Specifically, the memory access trace 214 already includes names of memory block regions that are accessed by a task. Address region information for those memory block regions are identified from the address mapping in the memory map information. The identified address region information is then added as parameters to the task node for the task. The additional parameters can include address_offset indicating the base address of a memory block region, data_memory_size indicating a size of a memory block region, inst_address_offset indicating the base address of an instruction memory block region, and inst_memory_size indicating a size of the instruction memory block region.

The memory type information is a list of different names of memory block regions and information describing, for each memory region, the type of the memory region. The type of the memory region indicates whether accesses to the memory region may need external bus access. Memory regions can be cacheable memory, non-cacheable memory or internal processor memory regions. The memory types are as follows:

(a) Cacheable: These are normal memories which are used for storing program and data. These memories are typically accessed through a memory interface of a processor. Access to these memories is cacheable.

(b) Non-cacheable: These are typically memory mapped devices. Access to them is non-cacheable. For example registers in the timers might be viewed as memory to processor or software. Such kind of accesses cannot be stored in processor cache.

(c) Internal: Some processor architectures support an internal scratch pad memory for fast memory access. There is no external bus access to these memories as the memories are fully internal to the processor.

The workload modeling tool 230 uses the memory type information to adjust the cache hit ratios described above. For non-cacheable memories, cache miss ratio is set to "1" because all accesses to this memory will miss the cache. For internal memories, the cache miss ratio is set to "0" because all these accesses will hit the internal memory, thereby requiring no external bus access. The workload modeling tool 230 then multiplies the load and store ratios by the miss cache miss ratios, as described above, to generate more accurate load and store ratios.

The user may manually specify the memory type information 222 in a configuration file. For example, the configuration file can specify that HARDWARE.MEM is a cacheable memory, HARDWARE.UART0 is a non-cacheable memory, and that HARDWARE.SCRATCHPAD is an internal memory.

Instruction Trace and Histogram

The previous target platform 204 may include an instruction accurate processor model that executes processor instructions in an instruction accurate manner but not in a cycle accurate manner. In this situation each processor instruction is assumed to take one cycle to execute. However, in real hardware, each instruction may take more than a cycle to execute. To increase the accuracy of the resulting workload model generated from an instruction accurate processor model, an instruction trace 218 and the instruction histogram 220 can be provided to the workload modeling tool 230.

The instruction trace 218 describes a sequence of specific processor instructions executed on the previous target platform 204 during execution of the previous software 202 on the previous target platform 204. For example, the instruction trace 218 may include the following sequence of instructions: DIV, ADD, MULT, ADD, ADD. The instruction trace can also include a rough timing of when the processor instructions are executed.

The instruction histogram 220 includes a list of different processor instruction types and cycle-per-instruction (CPI) information indicating an average number of cycles that each type of instruction is typically executed for. For example, the instruction histogram 220 may specify that a DIV instruction takes 45 cycles, and an ADD instruction takes 1 cycle. The instruction histogram 220 can be previously generated by measuring instruction execution times for different instruction types using a cycle accurate processor model, which has higher accuracy than the instruction accurate processor model.

The histogram 220 and instruction trace 218 are combined to determine the actual number of processing cycles for a task. Specifically, for each instruction of a task in the instruction trace 218, the CPI for the instruction is obtained from the histogram 220. The CPIs are then added together to compute the number of cycles that the task is executed for. The updated processing cycles are then used as the processing cycles parameter of the task graph.

Figure 7:
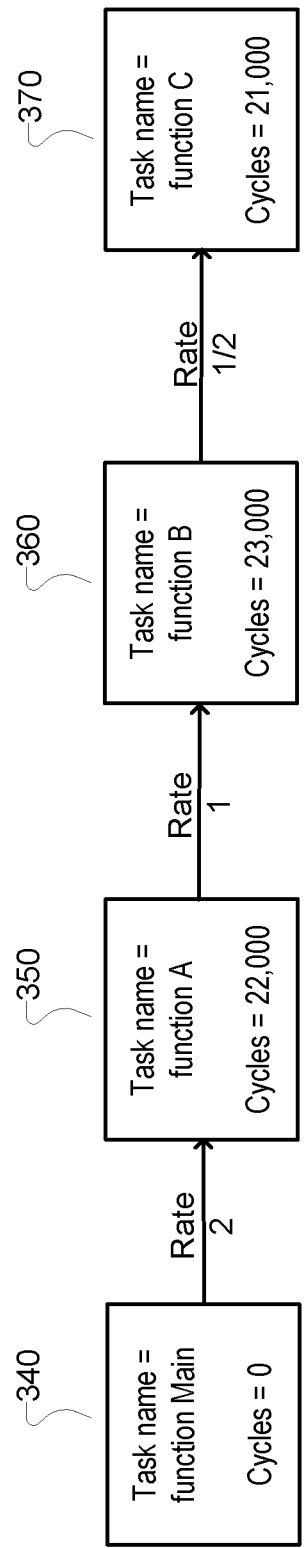
FIG. 7 illustrates a task graph from FIG. 3C that includes workload parameters adjusted for instruction execution times.

Referring to FIG. 7, illustrated is a task graph from FIG. 3C that includes workload parameters adjusted for instruction execution times. The cycle parameters are now higher relative to FIG. 3C because they have been adjusted to account for instruction execution times.

Figure 8:
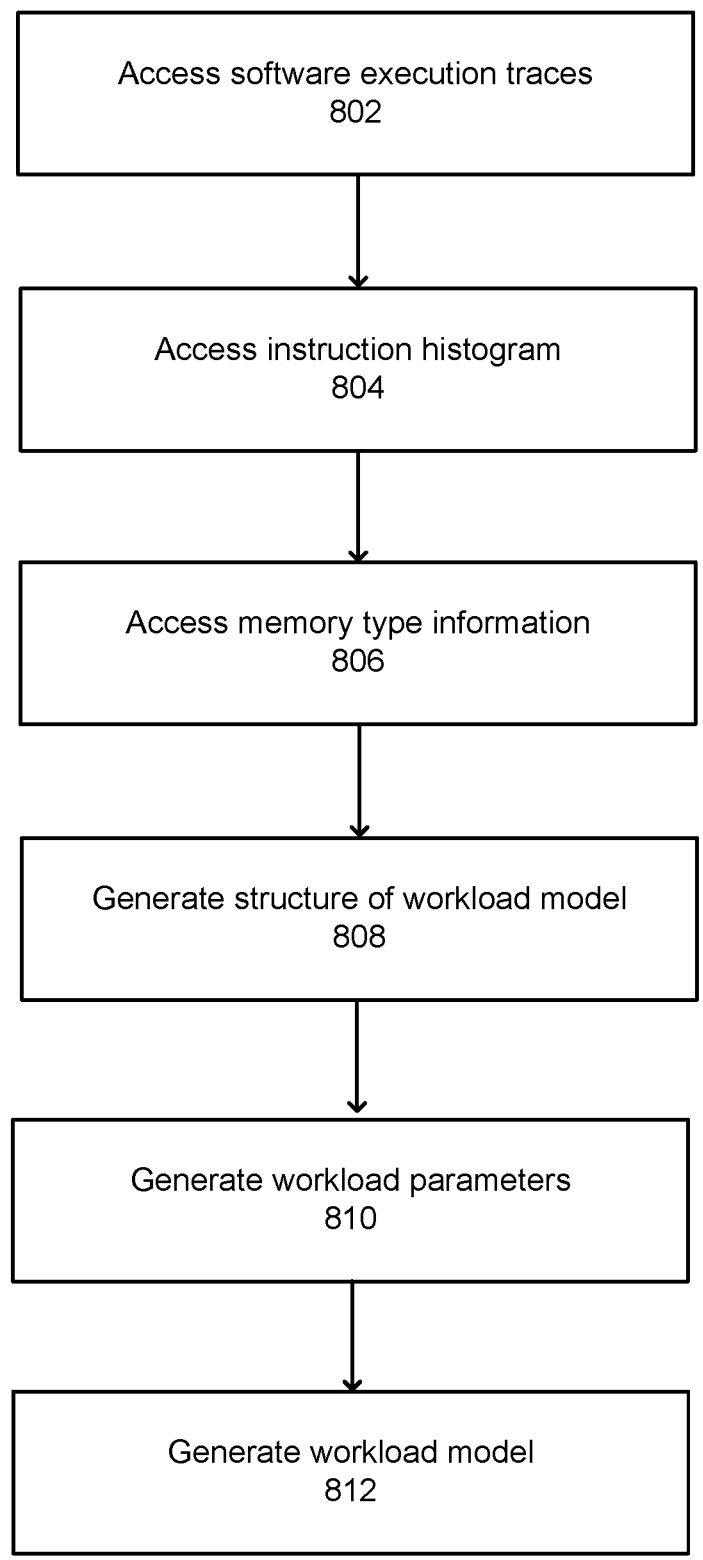
FIG. 8 illustrated is a flowchart for generating a workload model from software execution traces, according to an embodiment.

Referring to FIG. 8, illustrated is a flowchart for generating a workload model from software execution traces, according to an embodiment. The flowchart illustrates steps that can be performed by the workload modeling tool 230.

In step 802, one or more software execution traces are accessed electronically. The software execution traces describe execution of previous software 202 on the previous target platform 204 over time. The software execution traces include a primary software execution trace (e.g., context trace 210, function trace 212). The software execution traces may also include secondary software execution traces (e.g., memory access trace 214, cache trace 216, instruction trace 218). In step 804, instruction histogram information 804 is accessed electronically. In step 806 memory type information is accessed electronically.

In step 808, a structure of the workload model is generated from the context trace or the function race. Generating the structure can include identifying tasks within the context trace or the function trace, as well as extracting dependencies between the tasks. Nodes of a task graph are created for the tasks, and edges are created for the dependencies.

In step 810, workload parameters are generated from the software execution traces, instruction histogram, and memory type information. Generation of the workload model involves aggregating statistical workload information from the various inputs provided to the workload modeling tool 230. In one embodiment, generation of the workload model can include operations described herein, such as: extracting task activation frequencies from the software execution traces, computing average execution times of the tasks from the instruction trace 218, instruction histogram 220, and function/context traces, and computing memory access parameters from the memory access trace 214, cache trace 216, and memory region information 222.

In step 812, the workload model is generated by adding the workload parameters to the structure of the workload model. Specifically, workload parameters can be added to their respective nodes in a task graph. The resulting workload model thus describes tasks of the software and workloads on the target platform associated with the tasks of the software. Electronic data for the workload model is then stored for later use by the performance analysis tool 250. The performance analysis tool 250 can use the workload model to analyze performance of the new target platform design and generate a displayable analysis (e.g. a visualization of expected performance) that is displayed to a designer.

EDA Flow

Figure 9:
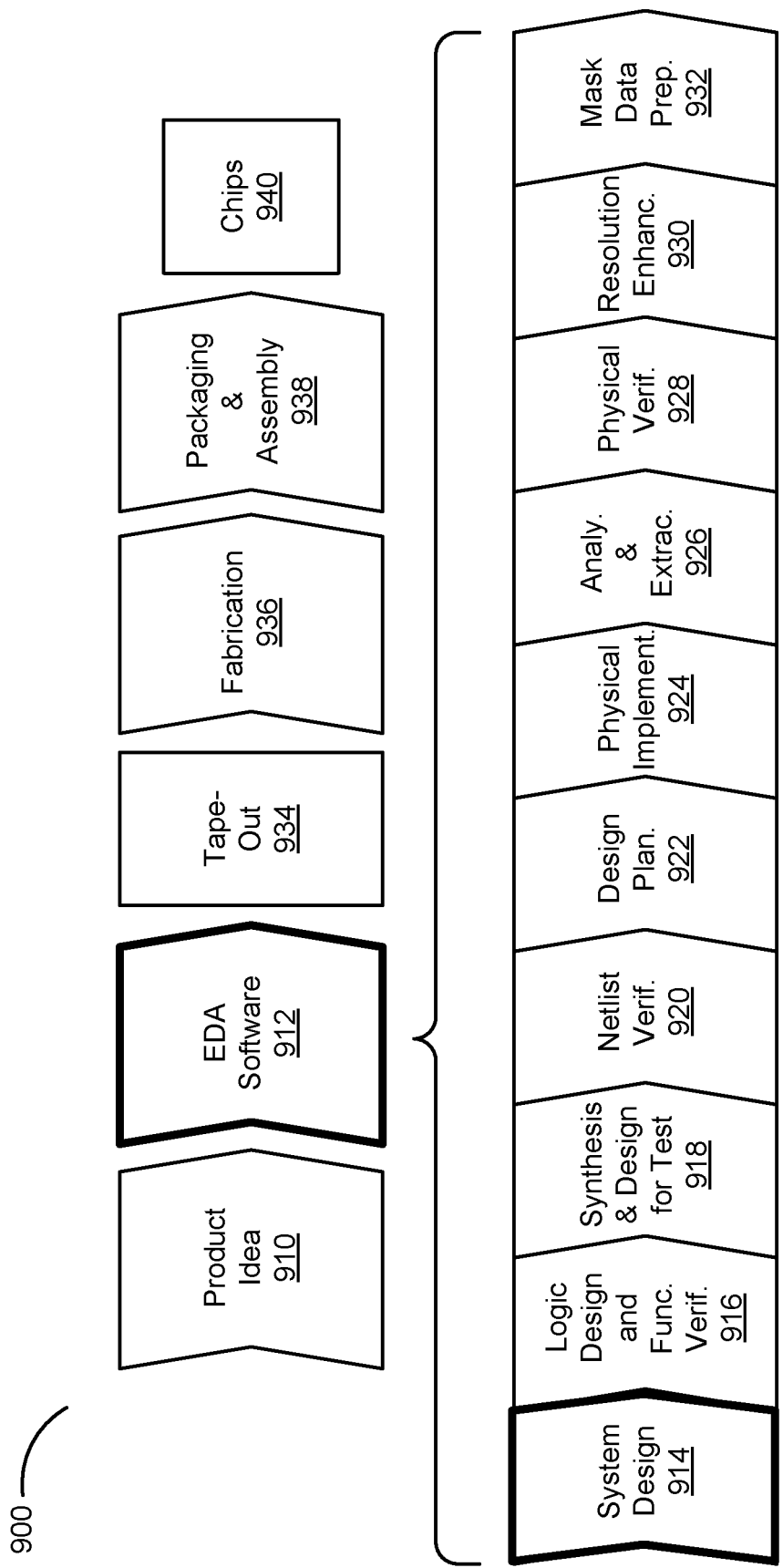
FIG. 9 is a flowchart illustrating the various operations in the design and fabrication of an integrated circuit, according to an embodiment.

FIG. 9 is a flowchart 900 illustrating the various operations in the design and fabrication of an integrated circuit, according to an embodiment. This process starts with the generation of a product idea 910, which is realized during a design process that uses an electronic design automation (EDA) software 912. When the design is finalized, it can be taped-out 934. After tape-out, a semiconductor die is fabricated 936 to form the various features (e.g., gates, metal layers, vias) in the integrated circuit design. Packaging and assembly processes 938 are performed, which result in finished chips 940.

Note that the design process that uses EDA software 912 includes operations 914-932, which are described below. This design flow description is for illustration purposes. In particular, this description is not meant to limit the present disclosure. For example, an actual integrated circuit design may require a designer to perform the design operations in a different sequence than the sequence described herein.

During system design 914, designers describe the functionality to implement. They can also perform what-if planning to refine the functionality and to check costs. Note that hardware-software architecture partitioning can occur at this stage. System design can also include architectural exploration, virtual prototyping and performance modeling. In some embodiments, the techniques of the present disclosure may be used during system design 914 for early architecture analysis of a SoC chip design. Example EDA software products from Synopsys, Inc. of Mountain View, Calif. that can be used at this stage include Platform Architect®, Saber® and System Studio® products.

During logic design and functional verification 916, VHDL or Verilog code for modules in the circuit is written and the design is checked for functional accuracy. More specifically, the design is checked to ensure that it produces the correct outputs. Example EDA software products from Synopsys, Inc. of Mountain View, Calif. that can be used at this stage include VCS®, Vera®, Magellan®, Formality®, ESP® and Leda® products.

During synthesis and design for test 918, VHDL/Verilog is translated to a netlist. This netlist can be optimized for the target technology. Additionally, tests can be designed and implemented to check the finished chips. Example EDA software products from Synopsys, Inc. of Mountain View, Calif. that can be used at this stage include Design Compiler®, Physical Compiler®, Test Compiler®, Power Compiler®, FPGA Compiler®, Tetramax®, and Designware® products.

During netlist verification 920, the netlist is checked for compliance with timing constraints and for correspondence with the VHDL/Verilog source code. Example EDA software products from Synopsys, Inc. of Mountain View, Calif. that can be used at this stage include Formality®, Primetime®, and VCS® products.

During design planning 922, an overall floor plan for the chip is constructed and analyzed for timing and top-level routing. Example EDA software products from Synopsys, Inc. of Mountain View, Calif. that can be used at this stage include Astro® and IC Compiler® products.

During physical implementation 924, the placement (positioning of circuit elements) and routing (connection of the same) occurs. Example EDA software products from Synopsys, Inc. of Mountain View, Calif. that can be used at this stage include the Astro® and IC Compiler® products.

During analysis and extraction 926, the circuit function is verified at a transistor level, which permits refinement. Example EDA software products from Synopsys, Inc. of Mountain View, Calif. that can be used at this stage include Astrorail®, Primerail®, Primetime®, and Star RC/XT® products.

During physical verification 928, the design is checked to ensure correctness for: manufacturing, electrical issues, lithographic issues, and circuitry. Example EDA software products from Synopsys, Inc. of Mountain View, Calif. that can be used at this stage include the Hercules® product.

During resolution enhancement 930, the layout undergoes lithographic simulations and geometric manipulations of the layout are performed to improve manufacturability of the design. Lithographic simulation is a two step process that involves mask image simulation and optical image simulation ("optical" is intended to include all wavelength bands used for patterning substrates). Example EDA software products from Synopsys, Inc. of Mountain View, Calif. that can be used at this stage include Proteus®, Proteus®AF, and PSMGED® products.

During mask-data preparation 932, the "tape-out" data for production of masks to produce finished chips is provided. Example EDA software products from Synopsys, Inc. of Mountain View, Calif. that can be used at this stage include the CATS® family of products.

Upon reading this disclosure, those of skill in the art will appreciate still additional alternative designs for generating workload models from execution traces. Thus, while particular embodiments and applications of the present disclosure have been illustrated and described, it is to be understood that the embodiments are not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the disclosure as defined in the appended claims.

What is claimed is:

1. A non-transitory computer readable medium storing instructions for software modeling, the instructions when executed by at least one processor cause the at least one processor to:
   generate one or more software execution traces describing execution times of tasks within software executed on a model of a hardware platform, the one or more software execution traces generated by executing the software on the model of the hardware platform;
   generate a workload model of the software based on the one or more software execution traces of the software executed on the model of the hardware platform, the workload model describing tasks of the software and workloads on the hardware platform caused by the tasks of the software; and
   generate an analysis for computation and memory performance of another model of another hardware platform based on the workload model used in place of the software.

2. The non-transitory computer readable medium of claim 1, wherein the workload model of the software is a task graph having task nodes, each task node representing a respective task of the software and including one or more respective workload parameters describing a workload associated with the task.

3. The non-transitory computer readable medium of claim 2, wherein:
   the one or more software execution traces include a function trace describing functions of the software and execution times of the functions, and
   the task graph is generated from the function trace and comprises edges connecting the task nodes, the task nodes representing the functions of the software, and the edges representing dependencies between the functions.

4. The non-transitory computer readable medium of claim 2, wherein:

the one or more software execution traces include a context trace describing contexts of the software and execution times of the contexts, each context representing a respective plurality of software functions, and the task graph comprises the task nodes without edges connecting the task nodes, the task nodes representing the contexts of the software.

5. The non-transitory computer readable medium of claim 1, wherein the instructions further cause the processor to:

access a memory access trace describing memory accesses during the execution of the software on the model of the hardware platform, and wherein the workload model is further generated based on the memory access trace.

6. The non-transitory computer readable medium of claim 1, wherein the instructions further cause the processor to:

access a cache trace describing cache accesses during the execution of the software on the model of the hardware platform, and wherein the workload model is further generated based on the cache trace.

7. The non-transitory computer readable medium of claim 1, wherein the instructions further cause the processor to:

access an instruction trace describing processor instructions executed during the execution of the software on the model of the hardware platform, and wherein the workload model is further generated based on the instruction trace.

8. The non-transitory computer readable medium of claim 7, wherein the instructions further cause the processor to:

access information describing respective instruction execution times for a plurality of processor instruction types, and wherein the workload model is further generated based on the information describing the respective instruction execution times for the plurality of processing instruction types.

9. The non-transitory computer readable medium of claim 1, wherein the instructions further cause the processor to:

access memory type information describing a plurality of memory regions and, for each memory region, a type of the memory region, and wherein the workload model is further generated based on the memory type information.

10. The non-transitory computer readable medium of claim 1, wherein the model of the hardware platform is an instruction accurate processor model.

11. A computer implemented method for software modeling, the method comprising:

generating one or more software execution traces describing execution times of tasks within software executed on a model of a hardware platform, the one or more software execution traces generated by executing the software on the model of the hardware platform;

generating a workload model of the software based on the one or more software execution traces of the software executed on the model of the hardware platform, the workload model describing tasks of the software and workloads on the hardware platform caused by the tasks of the software; and generating an analysis for computation and memory performance of another model of another hardware platform based on the workload model used in place of the software.

12. The method of claim 11, wherein the workload model of the software is a task graph having task nodes, each task node representing a respective task of the software and including one or more respective workload parameters describing a workload associated with the task.

13. The method of claim 12, wherein:

the one or more software execution traces include a function trace describing functions of the software and execution times of the functions, and the task graph is generated from the function trace and comprises edges connecting the task nodes, the task nodes representing the functions of the software, and the edges representing dependencies between the functions.

14. The method of claim 12, wherein:

the one or more software execution traces include a context trace describing contexts of the software and execution times of the contexts, each context representing a respective plurality of software functions, and the task graph comprises the task nodes without edges connecting the task nodes, the task nodes representing the contexts of the software.

15. The method of claim 12, further comprising:

accessing a memory access trace describing memory accesses during the execution of the software on the model of the hardware platform, wherein the workload model is further generated based on the memory access trace.

16. The method of claim 12, further comprising:

accessing a cache trace describing cache accesses during the execution of the software on the model of the hardware platform, wherein the workload model is further generated based on the cache trace.

17. The method of claim 12, further comprising:

accessing an instruction trace describing processor instructions executed during the execution of the software on the model of the hardware platform, wherein the workload model is further generated based on the instruction trace.

18. The method of claim 17, further comprising:

accessing information describing respective instruction execution times for a plurality of processor instruction types, wherein the workload model is further generated based on the information describing the respective instruction execution times for the plurality of processing instruction types.

19. The method of claim 11, further comprising:

accessing memory type information describing a plurality of memory regions and, for each memory region, a type of the memory region, wherein the workload model is further generated based on the memory type information.

20. The non-transitory computer readable medium of claim 1, wherein the another hardware platform comprises a new version of the hardware platform, and the instructions further cause the processor to:

display the analysis for computation and memory performance of the new version of the hardware platform.

21. A non-transitory computer readable medium storing instructions for software modeling, the instructions when executed by at least one processor cause the at least one processor to:

generate one or more software execution traces describing execution times of tasks within software executed on a model of a hardware platform, the one or more software execution traces generated by executing the software on the model of the hardware platform;

generate a workload model of the software based on the one or more software execution traces of the software executed on the model of the hardware platform, the workload model describing tasks of the software and workloads on the hardware platform caused by the tasks of the software; and generate a performance analysis for another model of another hardware platform based on the workload model, wherein the workload model is a task graph having task nodes, each task node representing a respective task of the software and including one or more respective workload parameters describing a workload associated with the task, the one or more software execution traces include a context trace describing contexts of the software and execution times of the contexts, each context representing a respective plurality of software functions, and the task graph comprises the task nodes without edges connecting the task nodes, the task nodes representing the contexts of the software.

22. A computer implemented method for software modeling, the method comprising:

generating one or more software execution traces describing execution times of tasks within software executed on a model of a hardware platform, the one or more software execution traces generated by executing the software on the model of the hardware platform;

generating a workload model of the software based on the one or more software execution traces of the software executed on the model of the hardware platform, the workload model describing tasks of the software and workloads on the hardware platform caused by the tasks of the software; and generating a performance analysis for another model of another hardware platform based on the workload model, wherein the workload model is a task graph having task nodes, each task node representing a respective task of the software and including one or more respective workload parameters describing a workload associated with the task, the one or more software execution traces include a context trace describing contexts of the software and execution times of the contexts, each context representing a respective plurality of software functions, and the task graph comprises the task nodes without edges connecting the task nodes, the task nodes representing the contexts of the software.

\* \* \* \* \*